Nov. 13, 1962 R. E. HERSEY 3,064,090
LINE TESTING CIRCUIT
Filed Sept. 29, 1960
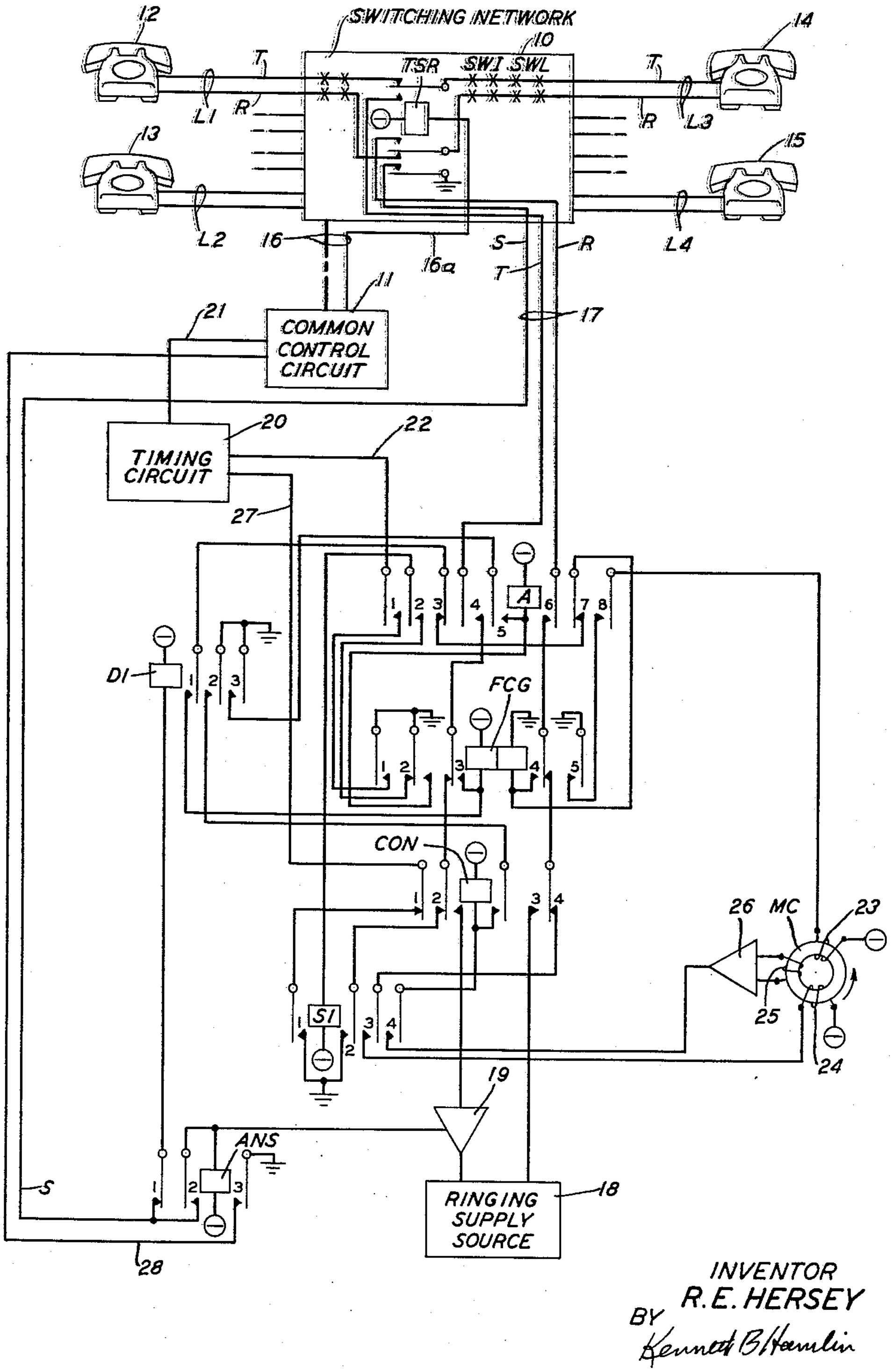
INVENTOR
R. E. HERSEY
BY Kenneth B. Hamlin
ATTORNEY United States Patent Office 3,064,090

Patented Nov. 13, 1962

3,064,090
LINE TESTING CIRCUIT

Ralph E. Hersey, Denville, N.J., assignor to Bell Telephone Laboratories, Incorporated, New York, N.Y., a corporation of New York Filed Sept. 29, 1960, Ser. No. 59,337
4 Claims. (Cl. 179—175.25)

This invention relates to automatic telephone switching systems, and more particularly to arrangements in such systems for testing the integrity of communication paths selectively established therethrough.

In automatic telephone switching systems of the common control type, communication paths between calling subscriber lines and called subscriber lines are selectively established through a switching network by common control circuits utilized on a time shared basis. In order to detect and reveal troubles in a large switching network and reduce the holding time of the common control circuits in such systems and to provide faster and improved service to subscribers, it is advantageous to test the integrity of a selected path through the switching network prior to applying ringing current to a called subscriber's line to signal the called subscriber. Thus, if the selected path through the network is faulty, the common control circuits are alerted, leave a record of the path, and immediately initiate the selection of an alternate path through the switching network from the calling subscriber's line to the called subscriber's line.

The false conditions that may be present on the tip and ring conductors of an established communications path through a switching network include a short circuit between the conductors, a cross to false battery or ground of either one or both of the conductors, and an open circuit or lack of continuity of either one or both of the conductors. These false conditions are indicative of an abnormal condition in the system or a malfunction or failure of some component in the system.

The known arrangements for testing the integrity of the electrical conductors of an established communications path have in general included one or more relays connected in an appropriate manner to test for short circuits and crosses to false battery or ground. These test circuits are selectively connected to the tip and ring conductors of the communications path, and if a short circuit or a false cross to battery or ground is present, a relay responds and operates an alarm circuit which signals the common control circuits. The prior arrangements for testing the continuity of the electrical conductors of the communications path have included a source of alternating-current voltage, a test relay, a gas filled tube, a transformer, and an impedance element selectively connected to the communications path under test in such a manner that current flow as a result of the alternating-current voltage applied to the path when continuity exists is sufficient to cause a potential drop across the impedance element of such a magnitude as to cause a breakdown of the gas tube. When the gas tube is ionized it in turn operates the test relay which signals the common control circuits that continuity exists.

The prior arrangements for testing the integrity of a communications path, although satisfactorily performing the testing function, have limitations which make their use in high speed electronic switching systems impractical. Due to the relatively slow operating speed, these circuits would impose an operating limitation on the high speed electronic systems. Furthermore, the complexity, bulk, the number of components, and the fact that a separate alternating-current voltage source must be supplied, are further disadvantages which make these circuits undesirable for use in high speed electronic switching systems.

It is an object of this invention to provide an improved testing arrangement for testing the integrity of a communications path selectively established in an automatic telephone switching system.

It is also an object of this invention to provide an improved testing arrangement for testing the continuity of a communications path selectively established in an automatic telephone switching system.

It is a further object of this invention to reduce the time required to test the integrity of the electrical conductors of a communications path selectively established in an automatic telephone switching system.

Further objects of the present invention are to provide a more economical, more reliable and less complex arrangement for testing the integrity of a communications path.

These and other objects of this invention are attained in a specific illustrative embodiment in which a test circuit in accordance with the invention is selectively connected to a communications path to be tested. The path comprises at least a pair of conductors having distributed capacitance therebetween. As is well known in the art, under normal conditions, any pair of closely placed and unshielded conductors have discrete incremental capacities between discrete parts thereof. The sum of these capacities has been termed distributed capacitance. In the immediate embodiment the distributed capacitance of a communications path is advantageously utilized for determining the continuity of that path. However, the path is initially tested for short circuits and crosses to false battery or ground. In accordance with an aspect of the invention, if one of these fault conditions is detected the common control circuits are immediately alerted and can immediately initiate the selection of an alternate path. In accordance with a further aspect of the invention, if these fault conditions are not present in the path, and in response to the successful completion of the short circuit and cross test, a further portion of the test circuit including a magnetic core having two stable states of magnetic remanence is connected to the electrical conductors of the communications path to make a continuity test. The core is driven to one of its two stable states of magnetic remanence and a potential is applied to the conductors of the selected path to charge the distributed capacitance thereof. If the distributed capacitance is above a particular or predetermined level, corresponding to and indicating continuity of the path, the charge current flowing in the path which includes a winding on the core will switch the core to its second stable state of magnetic remanence. In response to the switching of the core from its first to its second stable state, an output signal is induced in an output winding on the core, which signal indicates the continuity of the tested communications path. In the event that the communications path tested is open circuited at some point, the distributed capacitance of the path will be below the predetermined level and hence the charge current resulting from the charging of this distributed capacitance will be insufficient to switch the core from its first to its second stable state of magnetic remanence and no output signal will be induced in the output winding on the core. The lack of an output signal in the output winding on the magnetic core causes a signal to be sent to common control circuits to indicate that the test for continuity of the selected communications path failed and that the common control circuits should initiate the selection of an alternate path.

It is a feature of the present invention that a magnetic core having two stable states of magnetic remanence be utilized selectively to test the continuity of communications paths in an automatic telephone switching system.

It is a further feature of the present invention that the charge current flowing in a communications path as a result of the charging of the distributed capacitance of the path be utilized to switch a magnetic core from one stable state to a second stable state to indicate continuity of the communications path.

It is still a further feature of one aspect of the invention that the continuity test of a selected communications path in an automatic telephone switching system be initiated in response to the successful completion of a test for short circuits and crosses to false battery or ground.

The foregoing and other objects and features of the present invention will be more readily understood from the following description of an illustrative embodiment thereof when read in reference to the accompanying drawing, the single figure of which is a schematic diagram of a testing circuit embodying the principles of the invention.

Referring now the the drawing, a portion of a common control automatic telephone switching system is depicted generally in block diagram form and includes a switching network 10 terminating subscriber lines L1 through L4 extending respectively to subscriber stations 12 through 15. Communication paths between calling subscriber lines and called subscriber lines are selectively established through switching network 10 in the manner known in the art by common control circuit 11. This selective control is exercised by common control circuit 11 over conductors in cable 16.

The testing circuit in accordance with the present invention, which tests the integrity of an established communications path through switching network 10, comprises, as shown in the drawing, relay A and relay FCG which together make the test of a selected communications path for short circuits and crosses to false battery or ground, and magnetic core MC having two stable states of magnetic remanence for testing the continuity of the selected communications path. Relay CON is operated in the manner to be described, after a successful test of the selected communications path has been made, to apply ringing current from ringing supply source 18 to the T and R conductors of cable 17 extending to the switching network 10, which conductors are further connected to the T and R conductors of the called subscriber line. An answer detector 19 detects when the called subscriber lifts his hand-set to answer the call and in turn causes the tripping of the ringing signal and a release of the test circuit by the operation of relay ANS. Relay ANS in operating transmits a signal via lead 28 to common control circuit 11 to indicate that the called party has answered and that the test circuit of the present invention should be disconnected from the established communications path. Relays D1 and S1 shown in the drawing are utilized in the manner to be described to effect the successive testing of the selected communications path in two steps, that is the test for short circuits and crosses to false battery or ground and then the continuity test of the communications path. Timing circuit 20 is utilized after predetermined time intervals have elapsed to signal the common control circuit 11 via lead 21 that a fault condition has been detected in a selected communications path and that the common control circuit 11 should initiate the selection of an alternate path through switching network 10.

Assume that the subscriber at station 12 desires to call the subscriber at station 14. Common control circuit 11, in response to the offhook condition of the subscriber set at station 12 and in response to the dialing of the directory number for the called subscriber at station 14, will selectively establish a communications path through switching network 10 between subscriber line L1 and subscriber line L3 in the manner known in the art. This communications path is depicted symbolically within switching network 10 by the closure of contacts designated SWI representing the initial switching stage and contacts designated SWL representing the final switching stage within switching network 10.

There exists, as is well known in the art, distributed capacitance between any two conductors carrying electrical current, e.g., conductors T and R of line L3 and the communications path in switching network 10 connected thereto. When there is a continuous metallic path in the network and in the line to the subscriber's set, that is to say, when continuity exists therein, a particular or predetermined value of distributed capacitance exists in the path. As will be hereinafter described in greater detail the amount of distributed capacitance in the path will be sufficient to cause a charging current to switch the remanent state of the core MC. On the other hand, as will be also explained hereinafter in greater detail, when continuity does not exist in the path the amount of distributed capacitance therein will be lower than that particular amount present when a continuity exists in the path. Accordingly, the charging current will not be sufficient to switch the remanent state of the core MC.

When a selected communications path between calling subscriber line L1 and called subscriber line L3 has been established through switching network 10, common control circuit 11 in the manner known in the art selectively connects the T and R conductors of cable 17 which extend to the test circuit of the present invention to the T and R conductors of the established communications path. This may be accomplished in the manner illustrated in switching network 10 by the operation of relay TSR when a ground potential is applied to lead **16*a* in cable 16 by common control circuit 11. The operation of relay TSR disconnects the established communications path from the calling subscriber line L1 and connects it to the T and R conductors of cable 17. At the same time the operation of relay TSR places a ground on the S conductor of cable 17 which extends through back contact and armature 1 of normal relay ANS through the winding of relay D1 to battery. The ground potential applied to the S lead of cable 17 results in the operation of relay D1 which is held operated under control of relay ANS to ground on lead S in cable 17**.

The operation of relay D1 prepares a locking path for relay A and relay CON at front contacts and armatures 2 and 3 respectively to ground potential and also completes an operating path for relay FCG which may be traced from battery through the left hand winding of relay FCG, through front contact and armature 1 of operated relay D1, through back contact and armature 3 of normal relay A, through back contact and armature 7 of normal relay A, through the right hand winding of relay FCG to ground. The operation of relay FCG completes an operating path for relay A which may be traced from ground through front contact and armature 2 of operated relay FCG, and through the winding of relay A to battery. Relay A in operating locks operated through its own front contact and armature 5, and through front contact and armature 3 of operated relay D1 to ground.

The operation of relay A closes the T and R conductors of cable 17 through front contacts and armatures 4 and 6 respectively to armatures 3 and 4 of relay FCG. The operation of relay FCG completes a path respectively through the left and right hand windings of relay FCG to the T and R conductors of cable 17.

With both relay A and relay FCG operated, negative battery is applied through the left hand winding of relay FCG to the T conductor of cable 17 which in turn is connected to the T conductor of the established communications path. Similarly, ground is applied through the right hand winding of relay FCG to the R conductor in cable 17 which is in turn connected to the R conductor of the established communications path. If a short circuit is present between the T and R conductors of the established communications path, or if the T conductor is crossed to a false ground or positive potential or the R conductor is crossed to a false battery or negative potential, relay FCG will hold operated through these fault conditions and will not release.

If, however, there are no short circuits or crosses to false battery or ground potential present in the established communications path, relay FCG will release and transfer the T and R leads of cable 17 through to the armatures 2 and 4 respectively of relay CON.

The successful completion of the test for short circuits and crosses to false battery or ground is accomplished by the operation of relay FCG followed immediately by the operation of relay A and in turn by the immediate release of relay FCG. If, however, one of these fault conditions is present, relay FCG will not release and a signal will be transmitted to common control circuit 11 to indicate that an alternate communications path through switching network 10 should be selected.

With both relay FCG and relay A operated, a circuit is completed for energizing timing circuit 20 via conductor 22. This circuit may be traced from ground through front contact and armature 1 of operated relay FCG, through front contact and armature 1 of operated relay A over conductor 22 to timing circuit 20. Timing circuit 20 may advantageously comprise any of the timing circuits known in the art which in response to an enabling signal, ground on conductor 22 in this illustrative embodiment, provide a signal on conductor 21 after the elapse of a predetermined time interval. Thus if an enabling signal is maintained on conductor 22 for the predetermined interval, timing circuit 20 will provide a signal on conductor 21 which extends to common control circuit 11 and indicates to common control circuit 11 that a fault condition has been detected and that an alternate communications path through switching network 10 should be selected. In response to this signal, common control circuit 11 will release relay TSR in switching network 10 to disconnect the T and R conductors of cable 17 from the established communications path and remove the ground from lead S in cable 17 thus returning the test circuit of the present invention to normal. Thereafter common control circuit 11 will effect the establishment of an alternate communications path between lines L1 and L3 through switching network 10 and reconnect the test circuit of the invention to this alternate path in the manner described above.

The operation of relay FCG and relay A and the subsequent release of relay FCG when no fault conditions are encountered is such that the enabling signal, ground on conductor 22, is removed prior to the elapse of the predetermined timing interval for which timing circuit 20 has been set and thus common control circuit 11 does not receive a signal indicating a fault condition.

During the time that both relay FCG and relay A are operated a circuit is also completed for switching magnetic core MC to its set state to prepare core MC for the continuity test in accordance with the present invention. This circuit may be traced from battery through set winding 23 on magnetic core MC, through front contact and armature 8 of operated relay A, through front contact and armature 5 of operated relay FCG to ground. The current flow in set winding 23 will switch magnetic core MC to its first stable condition of magnetic remanence; the direction of the remanent flux is represented by the arrow shown in the drawing next to core MC. Hence magnetic core MC is driven to its set state in preparation for making the continuity test of the selected communications path. As is will known in the art, when a magnetic core is switched from one stable condition to a second stable condition a signal is induced in an output winding on this core, hence a signal will be induced on output winding 25 on magnetic core MC when magnetic core MC is switched to its set condition. This signal will be detected and amplified in amplier detector 26. However, because the output of amplifier detector 26 is open circuited at the front contact and armature 4 of normal relay S1 no further action of the circuit takes place at this time.

In the event that there are no short circuits or crosses to false battery or ground present in the established communications path as indicated above, relay FCG will release. With relay FCG released and relay A locked operated, a circuit is completed for the operation of relay S1 which may be traced from ground through back contact and armature 2 of normal relay FCG, through front contact and armature 2 of relay A, and through the winding of relay S1 to battery. When relay S1 operates it closes a path for applying ground potential to the T conductor of cable 17 which extends to the established communications path. This circuit may be traced from ground through front contact and armature 2 of operated relay S1, through back contact and armature 2 of normal relay CON, through back contact and armature 3 of normal relay FCG, through front contact and armature 4 of operated relay A to the T conductor of cable 17. The operation of relay S1 also closes a path for the application of negative potential to the R conductor of cable 17 which extends to the established communications path. This circuit may be traced from negative battery through reset winding 24 on magnetic core MC, through front contact and armature 3 of operated relay S1, through back contact and armature 4 of normal relay CON, through back contact and armature 4 of normal relay FCG, through front contact and armature 6 of operated relay A to the R conductor of cable 17 which extends to the R conductor of the established communications path. It will be noted that the polarity of potential applied to the T and R conductors of the established communications path when relay FCG releases and relay S1 operates is reversed from that previously applied through the windings of relay FCG. This reversal of potential applied to the T and R conductors of the established communications path charges the distributed capacitance of the T and R conductors in the reverse direction from that previously charged. The charging current resulting from this potential applied to the T and R conductors of the established communications path flows through reset winding 24 on magnetic core MC. If the distributed capacitance of the communications path is above a predetermined value, the resulting charging current is sufficient to reset magnetic core MC from its set condition or first stable state of magnetic remanence to its reset condition or its second state of magnetic remanence. When magnetic core MC is switched to the reset condition, a signal is induced in output winding 25 on magnetic core MC, which signal in turn is amplified in amplifier detector 26 and applied through front contact and armature 4 of the operated relay S1, through the winding of the CON relay to battery thus operating relay CON. In the event, however, that an open circuit condition exists in the established communications path, the distributed capacitance of T and R conductors of the path will be below the predetermined value required to switch magnetic core MC and hence magnetic core MC will not be switched to its reset condition. As a result, no signal will be induced in the output winding 25 on magnetic core MC with the result that no signal will be applied to operate relay CON.

When relay S1 operates, a circuit is completed for energizing timing circuit 20 via conductor 27. This circuit may be traced from ground through front contact and armature 1 of operated relay S1, through back contact and armature 1 of normal relay CON over conductor 27 to timing circuit 20. Thus a second timing interval is started in timing circuit 20 and if the enablng signal, ground on conductor 27 in the illustrative embodiment, is not removed prior to the elapse of the predetermined time interval, timing circuit 20 will provide an output signal on conductor 21 to common control circuit 11 to indicate that the continuity test of the selected communications path failed and that an alternate path should be selected.

In the event that there is continuity in the established communications path, the switching of magnetic core MC from its set to its reset state as described above will cause the operation of relay CON. Relay CON in operating locks operated over a circuit including its own front contact and armature 3, through front contact and armature 2 of operated relay D1 to ground. The operation of relay CON removes the enabling signal from conductor 27 extending to timing circuit 20 and thus prevents a signal from being transmitted to common control circuit 11. The operation of relay CON also closes through the T and R conductors of cable 17 at front contacts and armatures 2 and 4 respectively to the ringing supply source 18. Ringing supply source 18 supplies ringing current to the T and R conductors of cable 17 which extend to the T and R conductors of the called subscriber's line, line L3 in the assumed example. This ringing current is applied through answer detector 19 which in the manner known in the art detects the answer of the called subscriber at station 14. Ringing detector circuits which may advantageously be utilized for answer detector 19 are well known and may comprise any of the circuits which operate on an increase in line current effected by the closing of the switchhook contacts at the called subscriber's station. A ringing detector circuit which may also advantageously be utilized as answer detector 19 is disclosed in my copending application Serial No. 34,179 filed June 6, 1960.

When the called subscriber at station 14 lifts the handset from his sub-set in response to the ringing signal, detector 19 detects this and applies a signal to operate relay ANS. Relay ANS locks operated through its own front contact and armature 2 to ground on lead S. The operation of relay ANS also removes the holding ground from relay D1 permitting this relay to release. The release of relay D1 in turn releases the operated relay A and relay CON. The release of relay A in turn releases operated relay S1. The release of relay A and relay CON also disconnects the T and R conductors of cable 17 from ringing supply source 18. The operation of relay ANS also applies ground through its front contact and armature 3 to lead 28 which extends to common control circuit 11. This ground on lead 28 indicates to common control circuit 11 that the called subscriber at station 14 has answered and that the test circuit of the invention should be disconnected from the established communications path. Common control circuit 11 will effect the release of relay TSR in switching network 10 which disconnects the T and R conductors of cable 17 from the established communications path and will effect the removal of ground from lead S in cable 17. When ground is removed from lead S, relay ANS releases and the test circuit of the present invention is returned to normal.

Although the test circuit has been described above in connection with an automatic telephone switching system, it is to be understood that a test circuit in accordance with the principles of the invention may advantageously be utilized to test the integrity of any electrical circuit and hence it is not limited to use in an automatic telephone switching system. Furthermore, it is to be understood that the elements disclosed in the specific embodiment described above are illustrative only and that electronic gates or switching devices may advantageously be utilized in place of the relays disclosed in the illustrative embodiment. It is to be further understood that the above described embodiment is illustrative of the application of the principles of the invention. Numerous other arrangements may be devised by those skilled in the art without departing from the spirit and scope of the invention.

What is claimed is:

1. In a telephone switching system
(1) a plurality of subscriber lines;
(2) control means for selectively establishing communications paths between said lines, each of said paths having a particular value of distributed capacitance when continuity exists therein and another value of distributed capacitance when continuity does not exist therein; and
(3) means for testing the integrity of a selected path, said last-mentioned means comprising
(*a*) first testing means for testing said selected path for short circuits and crosses to false battery or ground, and
(*b*) second testing means controlled by said first testing means and operable when no short circuits or crosses are detected for testing the continuity of said selected path, said second testing means comprising
(I) a magnetic core having two stable states of magnetic remanence,
(II) means for setting the remanence of said core,
(III) a source of potential,
(IV) means for connecting said source to said selected path whereby current will flow in said path when the distributed capacitance therein is at the said particular value thereby to reset the remanence of said core, and
(V) means under the control of the resetting of said core for indicating that continuity exists in said selected path.

2. The invention defined in claim 1 wherein said first means comprises
(I) first winding means disposed on said core, and
(II) means for energizing said first winding means prior to coupling of said second means to said selected path thereby to set the remanence of said core; and
wherein said second means comprises
(I) second winding means disposed on said core,
(II) a source of potential, and
(III) means for serially connecting said source and said second winding means to said selected path; and wherein said third means comprises
(I) third winding means disposed on said core, and
(II) means connecting said third winding means to said control means whereby said resetting causes a signal to be induced in said third winding means which signal is applied by said connecting means to said control means.

3. In a telephone system
(1) a plurality of lines;
(2) a switching network;
(3) control means for selectively establishing communications paths through said network between calling ones of said lines and called ones of said lines, each of said communications paths having a distributed capacitance above a particular level when continuity exists therein and below said level when continuity does not exist therein; and
(4) testing means for selectively testing the continuity of a selected communications path, said testing means comprising
(*a*) a magnetic core having a first and a second stable state of magnetic remanence,
(*b*) first means for setting the remanence of said core to said first state,
(*c*) second means coupling said core to said selected path for charging the distributed capacitance thereof and when said distributed capacitance is above said particular level for resetting the remanence of said core to said second state, and (d) third means responsive to said resetting for notifying said control means that continuity exists in said selected path.

4. In a telephone system
(1) a plurality of lines;
(2) a switching network;
(3) control means for selectively establishing communications paths through said network between the calling ones of said lines and called ones of said lines, each of said paths having a particular value of distributed capacitance when continuity exists therein or a different value of distributed capacitance when continuity does not exist therein; and
(4) a test circuit for selectively testing the integrity of a selected communications path, said test circuit comprising
(a) first means under the control of said control means for testing said selected path for short circuits and crosses to false battery or ground,
(b) a magnetic core having two stable states of magnetic remanence,
(c) a first source of potential,
(d) a second source of potential,
(e) a set winding,
(f) a reset winding,
(g) an output winding, said windings being inductively coupled to said core,
(h) means controlled by said first means for connecting said set winding to said first source of potential to switch said core to one stable state,
(i) means controlled by said first means when no short circuits or crosses to false battery or ground exists in said selected path for connecting said selected path and said second source of potential to said reset winding whereby current will flow from said second source into said selected path when said particular value of capacitance exists therein thereby to switch the core remanence to the other stable state and to induce in said output winding an output signal, and
(j) detecting means connected to said output winding for detecting said output signal in said output winding.

References Cited in the file of this patent

UNITED STATES PATENTS

| | | |
|---|---|---|
| 2,414,624 | Wilson | Jan. 21, 1947 |
| 2,692,308 | Vaniman | Oct. 19, 1954 |
| 2,755,345 | Vaupel | July 17, 1956 |
| 2,963,689 | Stram | Dec. 6, 1960 |
| 2,970,293 | Eckert | Jan. 31, 1961 |
| 2,980,803 | Guterman | Apr. 18, 1961 |

OTHER REFERENCES

"Proceedings of the IRE," March 1955, Figure 1, page 291.